April 28, 1964 F. L. MALTBY ETAL 3,131,357

D.C. AMPLIFIER

Original Filed March 7, 1955

INVENTORS

Fred L. Maltby, Jacob Marlow, and Hubert A. Riester

BY

ATTORNEY.

United States Patent Office 3,131,357

Patented Apr. 28, 1964

3,131,357
D.C. AMPLIFIER

Frederick L. Maltby, Abington, and Jacob Marlow and Hubert A. Riester, Jr., Philadelphia, Pa., assignors to Robertshaw Controls Company, a corporation of Delaware Continuation of application Ser. No. 492,703, Mar. 7, 1955. This application June 8, 1959, Ser. No. 818,970
12 Claims. (Cl. 330—1)

Figure 1:
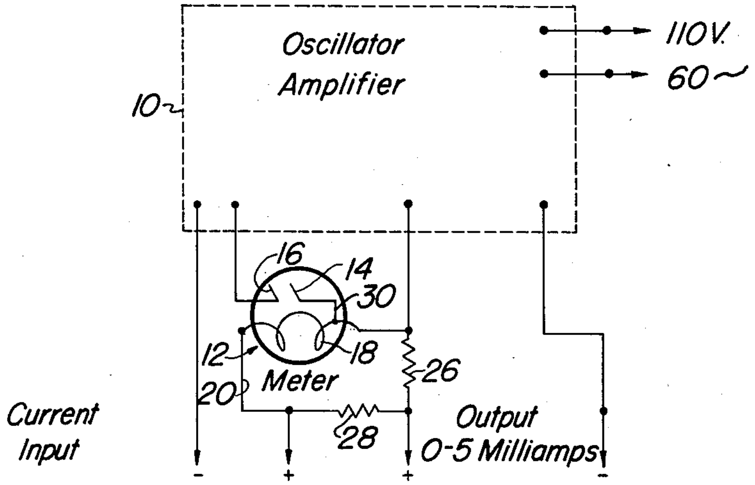

This invention relates to apparatus for linear amplification of a small direct current or voltage input and producing a high output current.

This application is a continuation of Serial No. 492,-703, filed March 7, 1955, now abandoned.

In the industrial and laboratory instrumentation field, there are many primary elements whose output intelligence is a comparatively small direct current or voltage signal. Often this signal must be amplified to operate commercially available deflecting meters for indicating, recording, or controlling. More often than not, the relatively small signal must be indicated or recorded at remote stations and therefore the problem of telemetering a small signal is encountered.

Known systems for amplifying these small direct current signals have been generally of the closed loop negative feedback type which usually utilize an electromechanical translating device for detecting variations in the direct current signals and for unbalancing the system response thereto. As is well known in the art, closed loop negative feedback systems are notoriously unstable as manifested by oscillations in the output current. With a given value of the moment of inertia of the moving parts of the electromechanical translating device, only a certain value of forward loop gain can be tolerated in the system before the highly undesirable oscillations in the output current are produced.

Attempts at increasing the static and dynamic damping constants in the electromechanical translating devices to prevent oscillation in the output current have been generally unsuccessful. Attempts to increase the static damping constants have, for instance, adversely affected the accuracy of these systems while attempts to increase the dynamic damping constants by reducing the size and mass of the moving parts have been completely impractical because the required sizes and masses would necesasrily be microscopic.

The present invention contemplates the use of an electromechanical translating device employing a pair of parallel spaced plates which function as a capacitor and which serve to vary the regenerative feedback of an oscillator circuit to change the amplitude of oscillation of an R.F. current produced therein. The arrangement of the parallel spaced plates, which have a direction of motion generally perpendicular to their planes, produces an effective dynamic damping for movement of the translating device and additionally allows the use of a maximum gain in the amplifier of this invention without producing oscillations in the output current therefrom.

A rectifier converts the R.F. signal from the oscillator circuit and feeds it as grid bias to a variable impedance stage. A feedback circuit is designed to impress a portion of the output current back onto the translating device at a value slightly below that of the input signal to cause the translating device to function as an error detecting device and the apparatus in general to function as a relatively high gain amplifier. This is seen from the fact that the negative feedback opposes the input signal and only a minute portion of the input signal is utilized to actuate the movable plates for initiating a relatively large R.F. voltage amplitude change in the oscillator circuit.

Moreover, this combination also acts in a manner to provide a negative feedback system whose output is continually stabilized against line voltage variations, tube aging, and temperature effects. Additionally, the system has a high speed of response coupled with high accuracy and is generally of a high performance type. Moreover, the input circuits to the system are designed to present a low dynamic load to the voltage or current sources and the device being a current generator in itself permits electrical telemetering up to thousands of feet.

Accordingly, it is an object of this invention to obtain maximum linear amplification of small direct current signals by utilizing a circuit having a large gain factor with sufficient negative feedback to prevent calibration drift.

Another object of this invention is to amplify minute direct current signals using a minimum of components and tubes and to arrange such components for producing a very high gain and to employ a negative feedback circuit opposing the input D.C. signal.

A further object of this invention is to produce an amplified direct current or voltage which is continually stabilized against line voltage variations, tube and component aging, such current or voltage retaining a linear and stable characteristic.

A further object of this invention is to utilize an effectively dynamically damped electromechanical translating device as a component of the amplifier of the present invention.

Still another object is to influence movement of a pair of substantially parallel spaced plates of a meter movement in response to the input signal to and the output signal from the amplifier of the present invention.

A still further object of this invention is to obtain rapid response and high accuracy in amplifying direct current signals.

Figure 2:
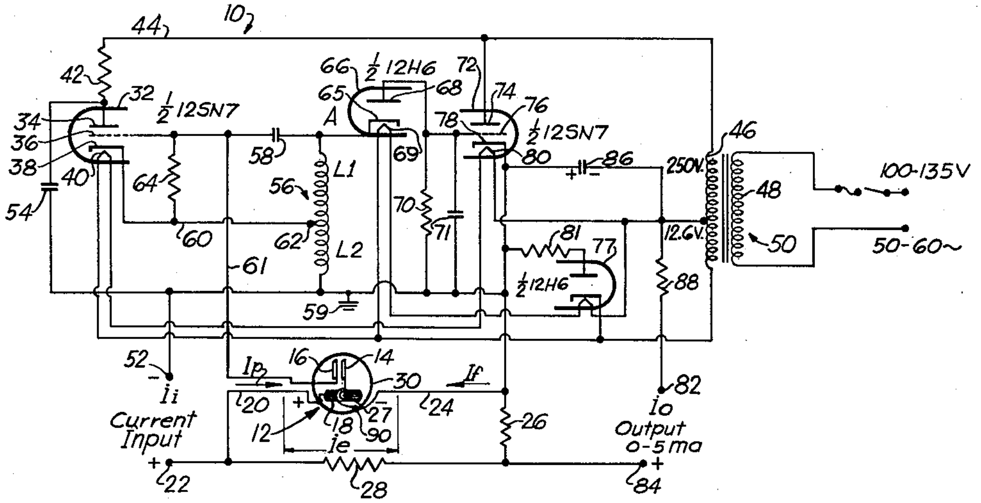

Other objects and advantages will become apparent from the following description taken in connection with the accompanying drawing wherein:

FIG. 1 is a circuit diagram illustrating the electrical current amplifier of the present invention with electrical connections to a modified galvanometer; and FIG. 2 is a schematic view of the preferred embodiment of the present invention.

Referring more particularly to the drawing, in FIG. 1 there is shown a D.C. amplifying apparatus comprising an oscillator-amplifier device, generally indicated by the reference numeral 10, and a modified D'Arsonval galvanometer, generally indicated by the reference numeral 12.

The galvanometer 12 is utilized as an electromechanical translating device in the present invention and is modified to include a substantially flat movable vane 14, which has a surface disposed perpendicular to its direction of motion, instead of the usual indicating pointer. Associated with the movable vane 14 is a fixed or stationary vane 16 to form a variable capacitor for a purpose to be described hereinafter. Vane 16 is also substantially flat, with a surface thereof disposed in a plane substantially parallel to the surface of plate 14. The stationary vane 16 is mechanically secured to the casing of the apparatus by a suitable insulating means. A moving meter coil 18 is pivoted at 27 about a stationary iron core (not shown) and is connected by a wire 20 to one terminal 22 of the input side of the apparatus. A pair of lead-in spiral springs, one of which is shown at 30, are designed to provide an electrical connection to coil 18 and to the vane 14 with a minimum of torque. The other end of the coil 18 and the vane 14 are connected by a wire 24 through resistances 26 and 28 to the input terminal 22.

Referring now to FIG. 2, there is shown the complete electrical current amplifier of the present invention and comprises essentially two major parts; the oscillator and variable impedance element using a twin triode tube 12SN7 or any other suitable commercially available tube. For convenience, the tube is shown in two sections, each of which is positioned with respect to the other parts of the circuit to show specific and separate functions to be performed thereby.

One half of the tube 12SN7, indicated generally by the reference numeral 32, serves as an oscillator and is provided with an anode 34, a grid 36, a cathode 38 and a heater 40 for the cathode 38. Power is supplied to the tube 32 through a resistor 42 and wire 44 from the secondary coil 46 of the transformer 48 having its primary 50 connected to an alternating current supply at conventional voltage and frequency, such as 115 volts and 60 cycles.

The anode 34 of the tube 32 is connected through a capacitor 54 to a ground connection 59 and the input terminal 52 is also grounded at this point. The grid 36 and the cathode 38 are coupled to an oscillatory tank circuit consisting of a coil 56 having two inductively coupled coils L1, L2, a coupling capacitor 58 and a variable capacitor composed of the vanes 14, 16. The grid 36 is connected to one side of the tank circuit through the capacitor 58 while the other side of the tank circuit is grounded at 59. A conductor 60 connects the cathode 38 with a center tap 62 between the coil windings L1, L2 and a grid bias resistor 64 is shunted across the cathode 38 and the grid 36 in the usual manner. To complete the oscillator circuit, a conductor 61 connects the fixed vane 16 to the oscillator circuit between the capacitor 58 and the grid 36.

In the oscillator circuit, the galvanometer 12 functions as an unbalance detector for changing the amplitude of oscillation in the circuit. The amount of gap between the variable capacitor vanes 14, 16 for zero input current at terminals 22, 52 is so related to the reactance value of the capacitor 58 and inductance windings L1, L2 as to maintain an oscillating condition in the oscillator circuit. Any movement of the movable vane 14 produced by an input signal being impressed across the terminals 22, 52 will alter the initial condition of the oscillator circuit and cause the regenerative feedback of the circuit to change thereby requiring a new magnitude of R.F. voltage to maintain oscillations. It will be apparent that any slight movement of the meter coil will change the vane capacity 14, 16 to alter the magnitude of regenerative feedback, and establish a new level of R.F. amplitude.

This R.F. voltage appearing across the coil 56 between point A and ground 59 is fed into the cathode 65 of one half of a twin diode 12H6 rectifier tube 66, and through a capacitor 71 into the anode 68. The resulting rectified voltage appears across a resistor 70 as a rectified control bias for a variable impedance tube 72, which may be the other half of the 12SN7 tube of which the oscillator 32 is a part.

This rectified control bias derived from the rectifier tube 66 serves to vary the plate current of the tube 72 which comprises the usual anode 74, grid 76, cathode 78 and heater 80 for the cathode. Power supply for the tube 72 is derived from the transformer 48 in the usual manner. A portion of the secondary 46 of the transformer 48, supplying 12.6 volts, is utilized to energize the heaters 40, 69 and 80 of the oscillator tube 32, the rectifier tube 66 and variable impedance tube 72, respectively.

The other half of the 12H6 tube, as generally indicated by the reference numeral 77, in conjunction with a resistor 81, serves to oppose any output current from the variable impedance tube 72 for purposes of suppressing the same to zero when there is no input current impressed on the input terminals 22, 52. To complete the circuit the cathode 78 is connected to the output terminal 82 through a filtering network comprising a capacitor 86 and a resistor 88. It is to be noted that one side of the network 86, 88 is in series with the resistor 26 and in electrical connection with the galvanometer coil 18 through the resistor 28. This allows a portion of the output current to reach the galvanometer movement as feedback which is in opposite direction to that of the input current across the terminals 22, 52.

*Operation*

An input current $i_i$ impressed across the terminals 22, 52 will cause a movement of the vane 14 toward the fixed vane 16 with a torque equal to $$T_p = i_p k \tag{1}$$

where $i_p$ is the meter current resulting from the input current and $k$ is a meter constant dependent upon the flux density, area of the coil, and the number of turns.

With the presence of the resistors 26 and 28, the meter current $i_p$ is related to the input current $i_i$ by the expression $$i_p = \frac{(R_{26}+R_{28})}{R_{26}+R_{28}+R_{18}} i_i \tag{2}$$

where $R_{18}$ is the resistance of the meter coil. However, a portion of the output current $i_o$ flowing in the opposite direction through the coil 18, causes an opposite torque on the coil 18 equal to $$T_n = i_f k \tag{3}$$

where $i_f$ is the portion of the output current applied to the coil as negative feedback.

With the presence of the resistors 26 and 28, $i_f$ is related to $i_o$ by the expression $$i_f = \frac{R_{26} i_o}{R_{26}+R_{28}+R_{18}} \tag{4}$$

In order to produce the output current $i_o$, there must be some movement of the movable vane 14 which can be expressed as a torque equal to $$T_m = i_e k \tag{5}$$

where $i_e$ is the error current due to the difference between $i_i$ and $i_f$ through the meter. Equating the torques $$T_p - T_n = T_m \tag{6}$$

we find $$k\left[\left(\frac{R_{26}+R_{28}}{R_{26}+R_{28}+R_{18}}\right) i_i - \left(\frac{R_{26} i_o}{R_{26}+R_{28}+R_{18}}\right)\right] = i_e k \tag{7}$$

However, since the current $i_e$ through the meter is related to the output current $i_o$ by $$i_o = \mu i_e \tag{8}$$

where $\mu$ is the current gain of the amplifier without negative feedback, the torque balance expression can be rewritten as follows $$i_i \frac{R_{26}+R_{28}}{R_{26}+R_{28}+R_{18}} - \frac{R_{26}}{R_{26}+R_{28}+R_{18}} i_o = \frac{i_o}{\mu} \tag{9}$$

The input-output relationship is then $$\frac{i_i}{i_o} = \frac{R_{26}}{R_{26}+R_{28}} + \frac{1}{\mu} + \frac{R_{18}}{(R_{26}+R_{28})\mu} \tag{10}$$

which expression indicates that the relationship between input and output currents is dependent only upon a ratio of resistors 26 and 28 and is relatively unaffected by the gain of the amplifier without feedback, provided of course, the latter is high. Moreover, it should be apparent from Equation 10, because of the high gain of the amplifier, that the relationship between the input and the output currents will be substantially linear.

The response time of the amplifier of this invention is a direct function of the rebalance time of the meter and has been found to be substantially instantaneous as a result of the disclosed meter construction utilized in conjunction with the disclosed circuitry. To illustrate this rebalance operation of the amplifier, let it be assumed that a maximum input current $i_i$ of 100 microamperes will cause vane 14 to move through an angle of 0.0006 radian to produce an output current $i_o$ of 5 milliamperes. With the vanes 14, 16 disposed in substantially parallel spaced relationship, it is apparent that their movement is substantially perpendicular throughout the small angular displacement required to produce a maximum output.

The instantaneous torque $T_p$ acting on vane 14, as a result of the applied input current $i_i$, reduces gradually to zero as a result of the torque $T_n$, produced by the negative feedback current $i_f$ acting on coil 18 in opposition to the input current $i_i$. As a result of the ever decreasing acceleration of the vane 14, the initial gap between the vane 14 and the vane 16, which may initially approximate 0.005 inch, is reduced and the air entrapped between the vanes will effectively and dynamically dampen movement of the vane 14. The amount of air dynamic damping may be so adjusted by the initial vane separation that overtravel of the vane 14 and overshoot in the magnitude of the output current at terminals 82, 84 is substantially eliminated. Assuming for simplicity that the acceleration of vane 14 decreases linearly, the angular velocity of vane 14 will be reduced to zero in approximately 0.005 second, which will be the response time of the amplifier.

It is to be noted that the R.F. voltage appearing across vanes 14, 16 is varied in direct proportion to the spacing of the vanes while the electrostatic attraction between the vanes is proportional to the square of the voltage appearing between the vanes and inversely proportional to the square of the distance between the vanes. Thus, in one embodiment of the present invention, it was found that the electrostatic attraction between the vanes was kept very small and it remained approximately constant throughout the range of movement of the vanes.

In another embodiment, the operating point of the oscillator and the magnitude of the voltage between the vanes 14 and 16 was so chosen as to cause the electrostatic attraction between the vanes to increase proportionally with the spacing of the vanes and thus fully cancel the torque increases produced by the deflection of the vane 14 in response to the applied input. As a result of this arrangement, the meter was provided with the usual spiral springs 30 which are commonly encountered in practice, and it was unnecessary to provide nearly torqueless mounting for the meter. With this arrangement, it is apparent, the accuracy of this system will be completely independent of such factors as line voltage variations, load variations, and aging of the components.

From FIG. 2, it is obvious that the R.F. path through the meter is direct to the fixed vane 16, across the air gap formed by the vanes 14, 16 and then through spiral spring 30 terminating on the negative meter terminal 90. The meter terminal 90 is in effect, common for the meter input circuit and the R.F. circuit. An input current $i_i$ to be amplified is impressed across the input terminals 22, 52 and is applied to the coil 18 of the galvanometer 12 by means of resistors 26 and 28. The actual current through the meter 12 is $i_p$ (without feedback) and the fact that a negative feedback current $i_f$ is impressed upon the meter circuit, it is obvious that the error current $i_e$ through the meter circuit equals the meter current without feedback minus the feedback current or, in symbols $i_e$ equals $i_p$ minus $i_f$.

Since the negative feedback $i_f$ is opposed to the meter current $i_p$, the resulting error current $i_e$ through the coil 18 of the meter 12 produces a movement in the movable vane 14 causing a capacity change between the vanes 14, 16 which is equivalent to a capacity change between the grid 36 of the oscillator tube 32 and ground 59. This capacity change causes a reactance change in the bridge network consisting of both coils L1, L2, the coupling capacitor 58 and the capacitor formed by the vanes 14, 16.

This reactance change in the circuit thus determines the amount of the regenerative feedback in the oscillator tube 32 which in turn determines the amplitude of oscillation. The capacitor 58 is selected so that the slightest movement of the movable vane 14 with respect to the fixed vane 16 will cause a gradual but maximum change of amplitude of oscillation of the oscillator tube 32.

As previously stated the voltage developed in the oscillator circuit is rectified and fed as a control bias to the variable impedance tube 72. The current through the tube 72 is then apportioned between the network composed of the resistors 26, 28 and the output terminals 82, 84. The current produced in the resistor 26 is utilized as negative feedback for the coil 18 to oppose the input current also impressed across the coil 18.

In the arrangement shown in FIG. 2, the negative feedback current $i_f$ interacts with the meter current from the input section of the apparatus so that the error current $i_e$ directly varies the regenerative feedback of the oscillator circuit for all usable values of the input current. As a consequence to this indirect effect on the oscillator circuit, a proportioned effect is felt at the amplifier stage of the apparatus in form of amplified current. Therefore the circuitry of the present invention is such that any change in the meter input current and hence the gap between the vanes 14, 16 produces an amplifying effect on the oscillator and controlling stage of the apparatus, and results in a proportionally amplified electrical intelligence.

Suitable values for the circuit components for 0–100 μamp. input and 0–5 ma. output are as follows:

| | |
|---|---|
| Resistance **26** | 203.75 ohms. |
| Resistance **28** | 10,000 ohms. |
| Resistances **42, 64, 70** | 1 megohm, .5 watt. |
| Resistance **81** | 2200 ohm, .5 watt. |
| Resistance **88** | 1800 ohm, .5 watt. |
| Capacitor **54** | .0005 microfarad. |
| Capacitor **58** | .000024 microfarad. |
| Capacitor **71** | .001 microfarad. |
| Capacitor **86** | 40 microfarad. |
| Coil **56** | 200 turns center tap 500 μh. |

We claim:

1. In an apparatus for amplifying a unidirectional current or voltage signal, the combination comprising an input circuit for receiving an input signal including a coil movable to a position determined by the electrical condition of said input circuit; an oscillator circuit including a variable capacitor using air as a dielectric, said oscillator circuit including an electronic amplifier element having a control electrode and a cathode and an L–C bridge circuit connected at each of a pair of diagonally disposed bridge terminals to said control electrode and said cathode, said bridge circuit having a characteristic frequency at which said oscillator operates and including said variable capacitor as one of the elements therein, whereby a variation in said variable capacitor creates an unbalance in said bridge circuit which varies the voltage across said pair of diagonal terminals to thereby change the bias between the control electrode and cathode of said amplifier such that the amplitude of the oscillations of said oscillator circuit is varied in proportion to a change in said variable capacitor; a fixed metal vane forming a part of said capacitor; a movable metal vane forming a part of said capacitor and disposed in substantially parallel relationship with said fixed vane, said movable vane being connected to said movable coil and positioned with respect to movement of said coil so as to move substantially on a line perpendicular to said vanes; and means connected to the output of said oscillator and operative to provide a unidirectional current output which varies in accordance with the amplitude of the output of said oscillator circuit and connected to said input circuit to apply a portion of said current output to said input circuit to produce an electrical condition that opposes the electrical condition of said input circuit produced in response to a received input signal.

2. In an apparatus for amplifying a unidirectional current or voltage signal, the combination comprising an input circuit for receiving an input signal, an electromechanical translating device movable in one direction in response to the electrical condition of said circuit established by an input signal; an oscillator circuit including a variable capacitor using air as a dielectric, said oscillator circuit including an electronic amplifier element having a control electrode and a cathode and an L-C bridge circuit connected at each of a pair of diagonally disposed bridge terminals to said control electrode and said cathode, said bridge circuit having a characteristic frequency at which said oscillator operates and including said variable capacitor as one of the elements therein, whereby a variation in said variable capacitor creates an unbalance in said bridge circuit which varies the voltage across said pair of diagonal terminals to thereby change the bias between the control electrode and cathode of said amplifier such that the amplitude of the oscillations of said oscillator circuit is varied in proportion to a change in said variable capacitor; a fixed metal vane forming a part of said capacitor; a movable metal vane disposed in substantially parallel relationship with said fixed vane, said movable vane being connected to said device and positioned with respect to movement of said device so as to move substantially on a line perpendicular to said vanes; and means connected to the output of said oscillator and operative to provide a unidirectional current output which varies in accordance with the amplitude of the output of said oscillator circuit and connected to said input circuit to apply a portion of said current output to said input circuit to produce an electrical condition that opposes the electrical condition of said input circuit produced in response to a received input signal.

3. In an apparatus for amplifying a unidirectional current or voltage signal, the combination comprising an input circuit for receiving the input signal including a coil movable to a position determined by the electrical condition of said input circuit; an oscillator circuit including a variable capacitor using air as a dielectric, said oscillator circuit including an electronic amplifier element having a control electrode and a cathode and an L-C bridge circuit connected at each of a pair of diagonally disposed bridge terminals to said control electrode and said cathode, said bridge circuit having a characteristic frequency at which said oscillator operates and including said variable capacitor as one of the elements therein, whereby a variation in said variable capacitor creates an unbalance in said bridge circuit which varies the voltage across said pair of diagonal terminals to thereby change the bias between the control electrode and cathode of said amplifier such that the amplitude of the oscillations of said oscillator circuit is varied in proportion to a change in said variable capacitor; a fixed metallic plate forming a part of said capacitor; a movable metallic plate forming a part of said capacitor and disposed in substantially parallel relationship with said fixed plate, said movable plate being connected to said movable coil and positioned with respect to movement of said coil so as to move substantially on a line perpendicular to said plates; rectifier means connected to the output of said oscillator for converting the output of said oscillator to a unidirectional current; and means connected to said rectifying means for amplifying said rectifier output and connected to said input circuit to supply a signal for establishing an electrical condition which is opposite to that caused by an input signal applied to said input circuit.

4. In an apparatus for amplifying a unidirectional current or voltage signal, the combination comprising an input circuit for receiving an input signal including a coil movable to a position determined by the electrical condition of said input circuit; an oscillator circuit including a variable capacitor using air as a dielectric, said oscillator circuit having a high frequency output the amplitude of which varies in response to changes of said variable capacitor; a fixed metal vane forming a part of said capacitor; a movable metal vane forming a part of said capacitor and disposed in substantially parallel relationship with said fixed vane, said movable vane being connected to said movable coil and positioned with respect to movement of said coil so as to move substantially on a line perpendicular to said vanes; means connected to the output of said oscillator and operative to provide a unidirectional current output which varies in accordance with the amplitude of the output of said oscillator circuit; and a feedback network connecting said means to said input circuit to apply a portion of said current output to said input circuit in opposition to said input signal, said feedback network comprising a pair of series connected feedback resistors connected in parallel with said coil, one of said feedback resistors being directly connected between the input and the output of said apparatus.

5. In an apparatus for amplifying a unidirectional current or voltage signal, the combination comprising an input circuit for receiving the input signal including a coil movable to a position determined by the electrical condition of said input circuit; an oscillator circuit including a variable capacitor using air as a dielectric, said oscillator circuit having a high frequency output the amplitude of which varies in response to changes of said variable capacitor; a fixed metallic plate forming a part of said capacitor; a movable metallic plate forming a part of said capacitor and disposed in substantially parallel relationship with said fixed plate, said movable plate being connected to said movable coil and positioned with respect to movement of said coil so as to move substantially on a line perpendicular to said plates; rectifier means connected to the output of said oscillator for converting the output of said oscillator to a unidirectional current; means connected to said rectifying means for amplifying said rectifier output and a feedback network connecting said means to said input circuit to apply a portion of the amplified output of said rectifier output to said input circuit in opposition to said input signal, said feedback network comprising a pair of series connected feedback resistors connected in parallel with said coil, one of said feedback resistors being directly connected between the input and the output of said apparatus.

6. In an apparatus for amplifying a unidirectional current or voltage signal, the combination comprising an input circuit for receiving an input signal including a coil movable to a position determined by the electrical condition of said input circuit; an oscillator circuit including a variable capacitor using air as a dielectric, said oscillator circuit including an electronic amplifier element having a control electrode and a cathode and an L-C bridge circuit connected at each of a pair of diagonally disposed bridge terminals to said control electrode and said cathode, said bridge circuit having a characteristic frequency at which said oscillator operates and including said variable capacitor as one of the elements therein, whereby a variation in said variable capacitor creates an unbalance in said bridge circuit which varies the voltage across said pair of diagonal terminals to thereby change the bias between the control electrode and cathode of said amplifier such that the amplitude of the oscillations of said oscillator circuit is varied in proportion to a change in said variable capacitor; a fixed metal vane forming a part of said capacitor; a movable metal vane forming a part of said capacitor and disposed in substantially parallel relationship with said fixed vane, said movable vane being connected to said movable coil and positioned with respect to movement of said coil so as to move substantially on a line perpendicular to said vanes; means connected to the output of said oscillator and operative to provide a unidirectional current output which varies in accordance with the amplitude of the output of said oscillator circuit; and a feedback network connecting said means to said input circuit to apply a portion of said current output to said input circuit in opposition to said input signal, said feedback network comprising a pair of series connected feedback resistors connected in parallel with said coil, one of said feedback resistors being directly connected between the input and the output of said apparatus.

7. In an apparatus for amplifying a unidirectional current or voltage signal, the combination comprising an input circuit for receiving the input signal including a coil movable to a position determined by the electrical condition of said input circuit; an oscillator circuit including a variable capacitor using air as a dielectric, said oscillator circuit including an electronic amplifier element having a control electrode and a cathode and an L-C bridge circuit connected at each of a pair of diagonally disposed bridge terminals to said control electrode and said cathode, said bridge circuit having a characteristic frequency at which said oscillator operates and including said variable capacitor as one of the elements therein, whereby a variation in said variable capacitor creates an unbalance in said bridge circuit which varies the voltage across said pair of diagonal terminals to thereby change the bias between the control electrode and cathode of said amplifier such that the amplitude of the oscillations of said oscillator circuit is varied in proportion to a change in said variable capacitor; a fixed metalic plate forming a part of said capacitor; a movable metallic plate forming a part of said capacitor and disposed in substantially parallel relationship with said fixed plate, said movable plate being connected to said movable coil and positioned with respect to movement of said coil so as to move substantially on a line perpendicular to said plates, rectifier means connected to the output of said oscillator for converting the output of said oscillator to a unidirectional current; means connected to said rectifying means for amplifying said rectifier output and a feedback network connecting said means to said input circuit to apply a portion of the amplified output of said rectifier output to said input circuit in opposition to said input signal, said feedback network comprising a pair of series connected feedback resistors connected in parallel with said coil, one of said feedback resistors being directly connected between the input and the output of said apparatus.

8. In an apparatus for amplifying a unidirectional current or voltage signal, the combination comprising an input circuit for receiving an input signal including a coil movable to a position determined by the electrical condition of said input circuit; an oscillator circuit including a variable capacitor using air as a dielectric, said oscillator circuit having a high frequency output and including means for varying the amplitude of said output while maintaining the frequency thereof constant in response to changes of said variable capacitor; a fixed metal vane forming a part of said capacitor; a movable metal vane forming a part of said capacitor and disposed in substantially parallel relationship with said fixed vane, said movable vane being connected to said movable coil and positioned with respect to movement of said coil so as to move substantially on a line perpendicular to said vanes; and means connected to the output of said oscillator and operative to provide a unidirectional current output which varies in accordance with the amplitude of the output of said oscillator circuit and connected to said input circuit to apply a portion of said current output to said input circuit to produce an electrical condition that opposes the electrical condition of said input circuit produced in response to a received input signal.

9. In an apparatus for amplifying a unidirectional current or voltage signal, the combination comprising an input circuit for receiving an input signal, an electromechanical translating device movable in one direction in response to the electrical condition of said circuit established by an input signal; an oscillator circuit including a variable capacitor using air as a dielectric, said oscillator circuit having a high frequency output and including means for varying the amplitude of said output while maintaining the frequency thereof constant in response to changes of said variable capacitor; a fixed metal vane forming a part of said capacitor; a movable metal vane disposed in substantially parallel relationship with said fixed vane, said movable vane being connected to said device and positioned with respect to movement of said device so as to move substantially on a line perpendicular to said vanes; and means connected to the output of said oscillator and operative to provide a unidirectional current output which varies in accordance with the amplitude of the output of said oscillator circuit and connected to said input circuit to apply a portion of said current output to said input circuit to produce an electrical condition that opposes the electrical condition of said input circuit produced in response to a received input signal.

10. In an apparatus for amplifying a unidirectional current or voltage signal, the combination comprising an input circuit for receiving the input signal including a coil movable to a position determined by the electrical condition of said input circuit; an oscillator circuit including a variable capacitor using air as a dielectric, said oscillator circuit having a high frequency output and including means for varying the amplitude of said output while maintaining the frequency thereof constant in response to changes of said variable capacitor; a movable metallic plate forming a part of said capacitor and disposed in substantially parallel relationship with said fixed plate, said movable plate being connected to said movable coil and positioned with respect to movement of said coil so as to move substantially on a line perpendicular to said plates; rectifier means connected to the output of said oscillator for converting the output of said oscillator to a unidirectional current; and means connected to said rectifying means for amplifying said rectifier output and connected to said input circuit to supply a signal for establishing an electrical condition which is opposite to that caused by an input signal applied to said input circuit.

11. In an apparatus for amplifying a unidirectional current or voltage signal, the combination comprising an input circuit for receiving an input signal including a coil movable to a position determined by the electrical condition of said input circuit; an oscillator circuit including a variable capacitor using air as a dielectric, said oscillator circuit having a high frequency output and including means for varying the amplitude of said output while maintaining the frequency thereof constant in response to changes of said variable capacitor; a fixed metal vane forming a part of said capacitor; a movable metal vane forming a part of said capacitor and disposed in substantially parallel relationship with said fixed vane, said movable vane being connected to said movable coil and positioned with respect to movement of said coil so as to move substantially on a line perpendicular to said vanes; means connected to the output of said oscillator and operative to provide a unidirectional current output which varies in accordance with the amplitude of the output of said oscillator circuit; and a feedback network connecting said means to said input circuit to apply a portion of said current output to said input circuit in opposition to said input signal, said feedback network comprising a pair of series connected feedback resistors connected in parallel with said coil, one of said feedback resistors being directly connected between the input and the output of said apparatus.

12. In an apparatus for amplifying a unidirectional current or voltage signal, the combination comprising an input circuit for receiving the input signal including a coil movable to a position determined by the electrical condition of said input circuit; an oscillator circuit including a variable capacitor using air as a dielectric, said oscillator circuit having a high frequency output and including means for varying the amplitude of said output while maintaining the frequency thereof constant in response to changes of said variable capacitor; a fixed metallic plate forming a part of said capacitor; a movable metallic plate forming a part of said capacitor and disposed in substantially parallel relationship with said fixed plate, said movable plate being connected to said movable coil and positioned with respect to movement of said coil so as to move substantially on a line perpendicular to said plates; rectifier means connected to the output of said oscillator for converting the output of said oscillator to a unidirectional current; means connected to said rectifying means for amplifying said rectifier output and a feedback network connecting said means to said input circuit to apply a portion of the amplified output of said rectifier output to said input circuit in opposition to said input signal, said feedback network comprising a pair of series connected feedback resistors connected in parallel with said coil, one of said feedback resistors being directly connected between the input and the output of said apparatus.

References Cited in the file of this patent

UNITED STATES PATENTS

| | | |
|---|---|---|
| Re. 23,850 | Roper | July 13, 1954 |
| 2,154,260 | Brandenburger | Apr. 11, 1939 |
| 2,406,492 | Dorsman | Aug. 27, 1946 |
| 2,423,617 | Rath | July 8, 1947 |
| 2,446,390 | Rath | Aug. 3, 1948 |
| 2,756,286 | Johnson et al. | July 24, 1956 |
| 2,867,757 | Wagner | Jan. 6, 1959 |
| 2,867,758 | Wilstead | Jan. 6, 1959 |